June 7, 1955
D. T. HAWORTH
2,710,192
GRAVEL SPREADER
Filed Sept. 25, 1952
4 Sheets-Sheet 1
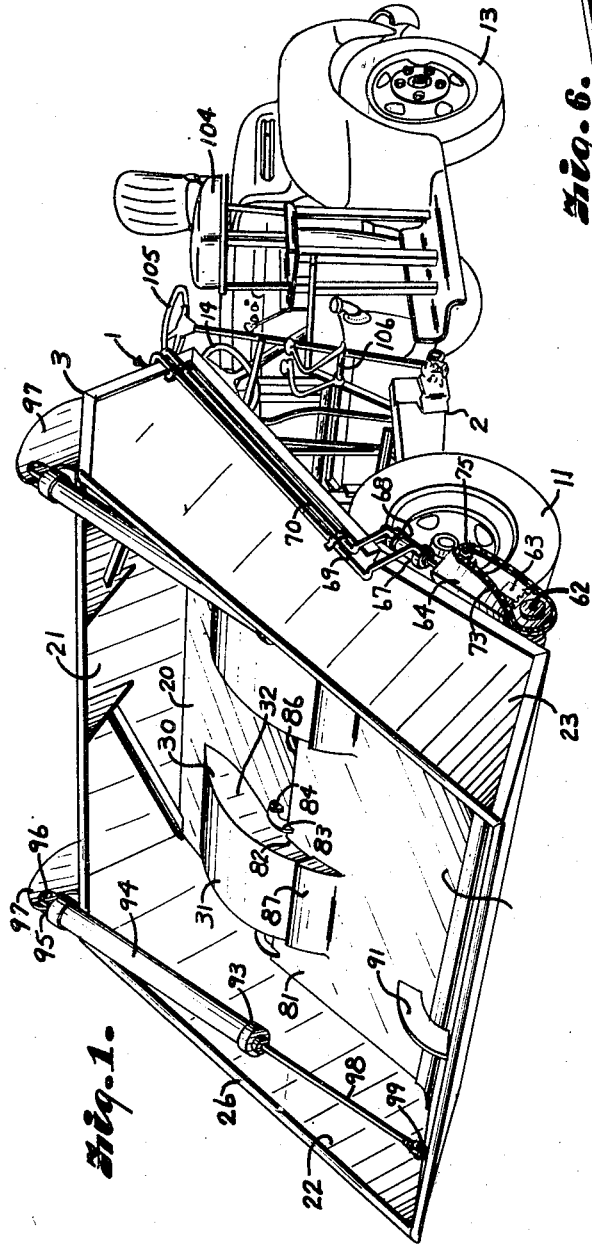
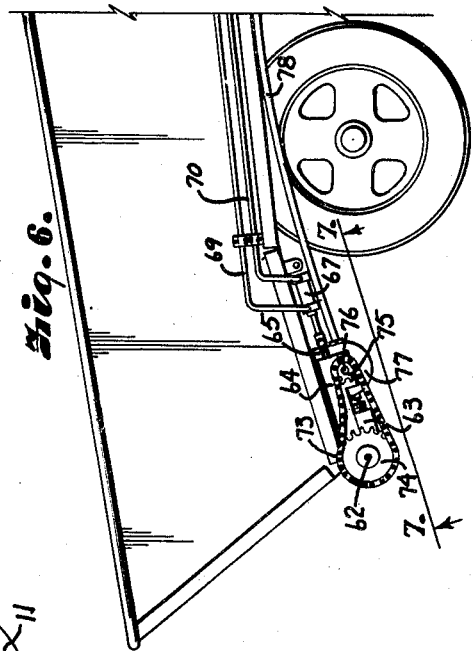
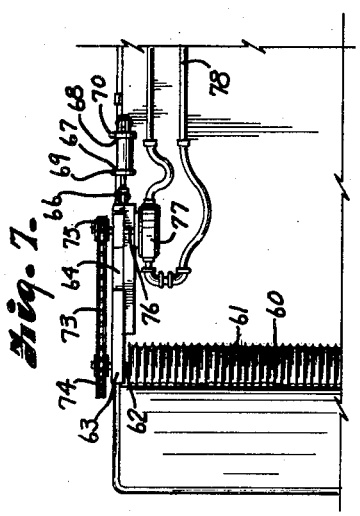
INVENTOR.
Dwight T. Haworth.
BY
Fishburn & Mullendore
ATTORNEYS.

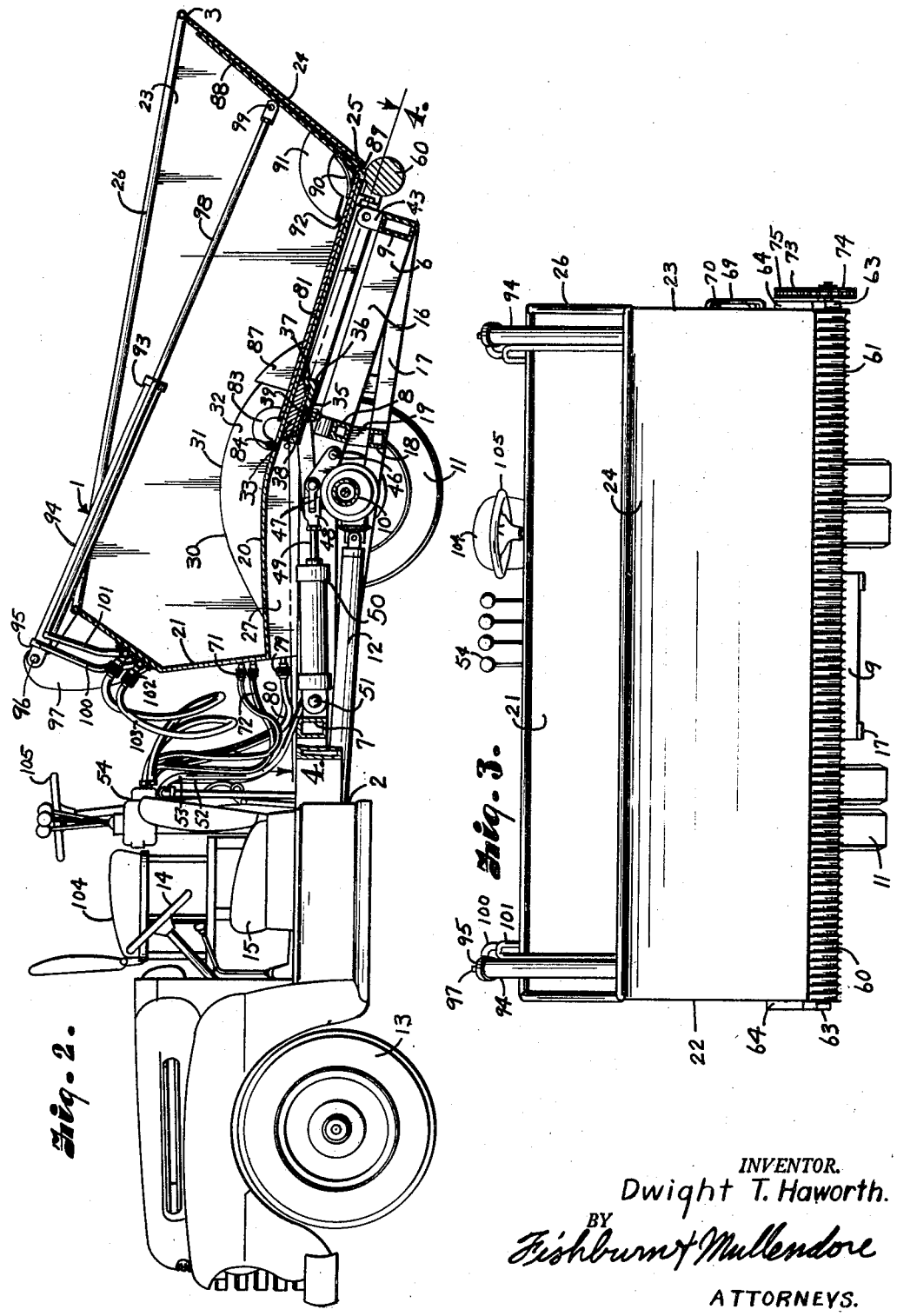

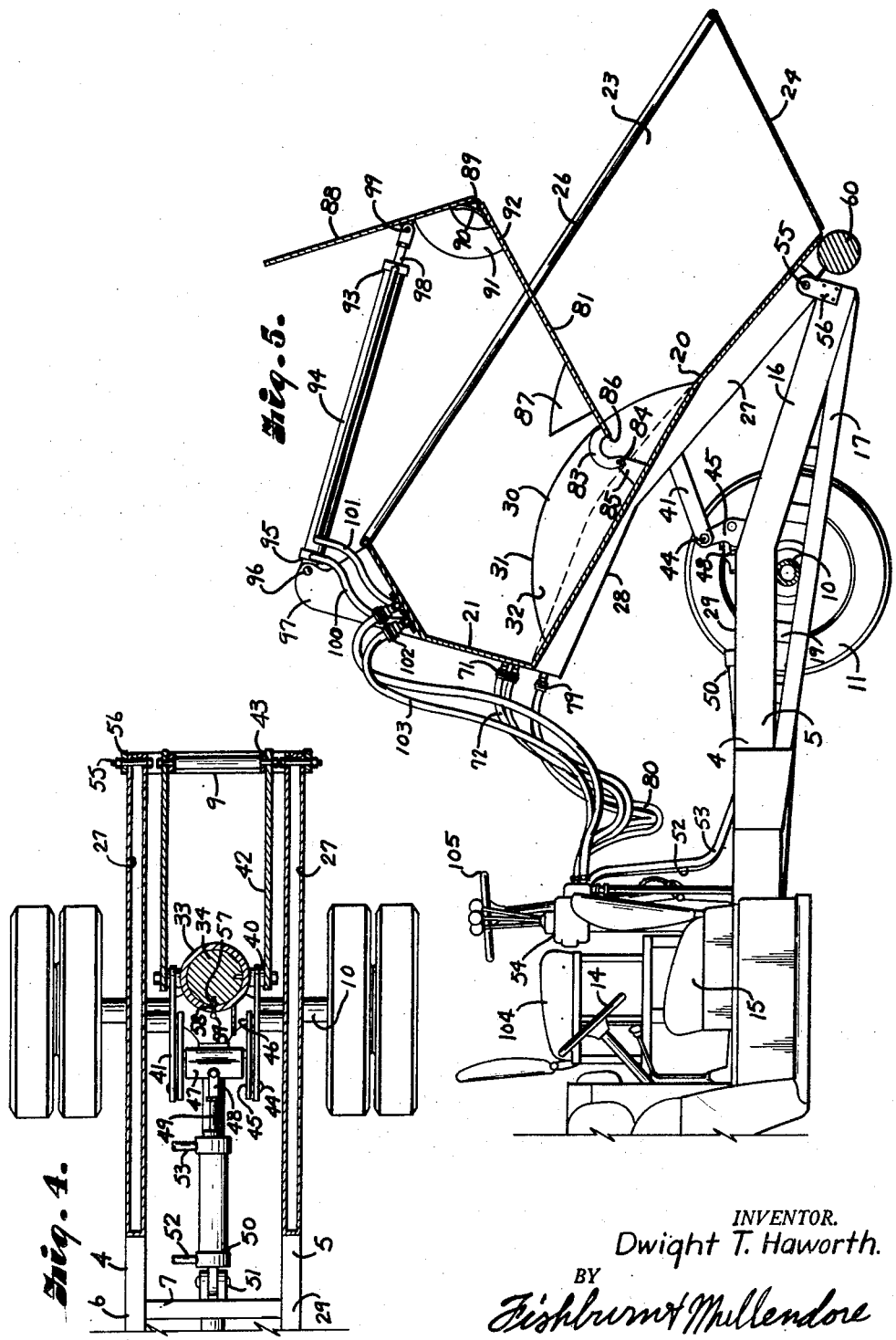

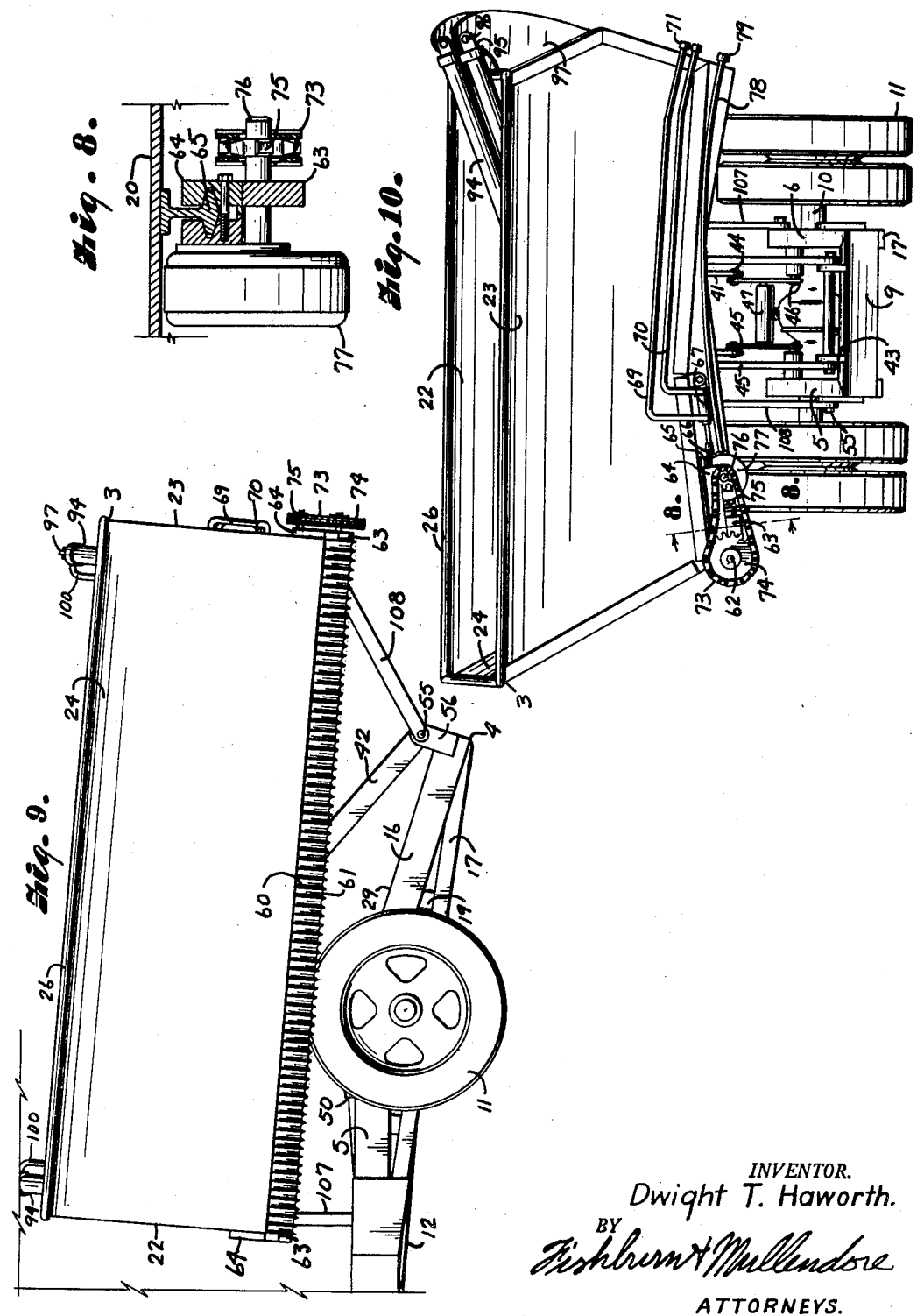

United States Patent Office 2,710,192
Patented June 7, 1955

2,710,192

GRAVEL SPREADER

Dwight T. Haworth, Ottawa, Kans.

Application September 25, 1952, Serial No. 311,487

6 Claims. (Cl. 275—2)

This invention relates to spreaders for gravel and the like, and more particularly to a motor driven vehicle with a dump body and mechanism for discharging and distributing gravel, sand and the like on roads.

In the maintenance of black top and like roads it is customary to grade the road and then spray same with bituminous or asphalt material and spread gravel or the like over the sprayed surface. It is desirable that no vehicle operate over the road surface after it is sprayed until the gravel is spread thereon. It is desirable to spread the gravel to a twelve foot width at one pass, but a vehicle such as a dump truck having portions that wide could not travel along highways from one place to another due to governmental regulations as to maximum width of vehicles operating on highways. Therefore, in present day maintenance work the spreader usually is a separate wheel mounted device, approximately twelve feet in width, which is fastened to the rear of an ordinary dump truck carrying the gravel. The dump truck and spreader are backed over the sprayed surface, the dump truck body being tilted to move the load of gravel into the spreader as the truck and spreader move along the road. After the dump truck is empty the spreader is fastened to another truck which has backed over the gravel surface and is waiting its turn to spread its gravel load. When the body of the dump truck is elevated to dump the gravel in the spreader the driver's vision is blocked by the dump body making it difficult for the driver to maintain the margins of the spread gravel coincident with the margins of the sprayed surface. Also it is necessary for two men to ride on the spreader to manually move the gravel toward the sides thereof to obtain an even distribution of the gravel therein for discharge from the spreader.

The objects of the present invention are to provide a self-propelled spreader with a dump body of relatively large capacity and of a width substantially equal to the width of the coating of gravel to be spread; to provide a gravel spreader with a rotatably mounted dump body of greater width than length and a length less than the maximum width limits of highway regulations whereby the body may be turned 90° and anchored for movement of the spreader along highways from one job to another; to provide a gravel spreader of large capacity with mechanism for tilting the body whereby the rear wall is lowered to a height to extend under a normal dump body to permit the dump truck to dump gravel into the spreader body; to provide such a gravel spreader with a swingable baffle and/or floor with power mechanism for moving the baffle and gravel thereon to the forward portion of the spreader body to leave room in the rear thereof for additional gravel; to provide a space between the bottom and the baffle and/or floor when in raised position for movement of gravel from the front to the rear of the body during spreading operations; to provide an adjustable mounting for a feed roller and drive therefor for regulating the quantity of gravel discharged from the spreader body; to provide a gravel spreader structure which eliminates the disadvantages of present day spreaders; to provide a gravel spreader with an elevated auxiliary seat and steering mechanism for better vision of the road when the driver is backing the spreader thereover; and to provide a gravel spreader of sturdy construction, large capacity, which is efficient in operation and capable of being moved over roads as desired in the spreading of gravel and in traveling from one location to another.

In accomplishing these and other objects of the present invention, I have provided improved details of structure, the preferred forms of which are illustrated in the accompanying drawings, wherein:

Fig. 1 is a perspective view of a gravel spreader embodying the features of the present invention.

Fig. 2 is a side elevation of the spreader with portions broken away to illustrate the dump body structure and mounting thereof.

Fig. 3 is a rear elevation of the spreader.

Fig. 4 is a horizontal sectional view through the turntable mounting of the dump body on the line 4—4, Fig. 2.

Fig. 5 is a side elevation of the spreader with the body in gravel spreading position, portions of said body being broken away to illustrate the position of the baffle.

Fig. 6 is a side elevation of the rear portion of the spreader particularly illustrating the drive for the feed roller.

Fig. 7 is a bottom view of the feed roller drive taken on the line 7—7, Fig. 6.

Fig. 8 is a transverse sectional view through the ways and block carrying the feed roller on the line 8—8, Fig. 10.

Fig. 9 is a side elevation of the spreader with the body rotated into traveling position.

Fig. 10 is a rear elevation of the spreader with the body located in traveling position.

Referring more in detail to the drawings:

1 designates a gravel spreader which includes a self-propelled vehicle chassis 2, with a dump body 3 pivotally mounted on the chassis. The chassis 2 has a frame 4 consisting of spaced side members 5 and 6 extending longitudinally of the chassis and spaced transverse members 7, 8 and 9 to provide rigidity thereto. A rear axle 10 is carried by the frame 4 and is provided with traction wheels 11. The rear axle 10 is preferably of conventional structure such as used on trucks whereby an engine (not shown) drives the rear wheels 11 through a propeller shaft 12 and rear axle mechanism. The chassis is provided with front wheels 13 which are steered through a steering wheel 14 by an operator sitting in a seat 15 when the spreader is moving along a highway from one location to another.

The frame side members 5 and 6 have downwardly and rearwardly inclined portions 16 to position the rear end of the frame closer to the road surface to facilitate loading of the dump body 3 as later described, the downwardly inclined portions 16 preferably extending rearwardly from adjacent the rear axle 10. The frame 4 is preferably reinforced by longitudinal stringers 17 arranged under the respective side members and having ends connected thereto adjacent the transverse members 7 and 9 which are respectively forwardly and rearwardly of the rear wheels. A transverse member 18 connects the stringers adjacent the transverse member 8 and the side members and stringers are connected by upright members 19 preferably adjacent the transverse member 8 to further add rigidity and strength to the chassis frame members.

The dump body 3 is preferably of a width substantially equal to the width of a strip desired to be covered with gravel at one pass, for example twelve feet, and the length of the body is less than the maximum width limits provided by governmental regulations for vehicles proceeding along the highways. The dump body has a bottom 20, front wall 21, side walls 22 and 23 and a rear wall 24. The bottom, front, side and rear walls are connected into a unitary structure with the rear edge of the bottom wall 20 spaced from the bottom edge of the rear wall 24 to provide a slot 25 extending transversely of the body for the full width thereof. The upper edges of the front, side and rear walls are rolled or otherwise provided with a peripheral cylindrical member 26 to eliminate sharp edges and add rigidity to said walls. Spaced longitudinal sills 27 are secured to the bottom 20 of the dump body, said sills being shaped to conform to the portions of the frame side members 5 and 6 whereby the bottom surfaces 28 of the sills 27 are adapted to overlie and rest on the upper surfaces 29 of the frame side members with the rear ends of the sills substantially coinciding with the rear ends of the frame side members.

The front wall of the dump body, when the sills are resting on the frame members, preferably slopes slightly forwardly and upwardly for approximately one-half of the height of the body and then upwardly and rearwardly to aid in retaining gravel within the body when portions of the gravel are moved to the front thereof as later described. The rear wall slopes upwardly and rearwardly to provide increased capacity and to facilitate loading as later described. Since the dump body is wider than the chassis and extends over the rear wheels thereof, the bottom 20 is provided with openings of sufficient size to provide clearance for the wheels and said openings are covered by wheel housings 30 having arcuate top walls 31 and side walls 32, the lower edges of which are secured to the bottom 20 as by welding. The center portion of the bottom 20 between the wheel housings 30 conforms to the upper surface of the sills 27; however, the portions of the bottom 20 at the outer sides of the wheel housings preferably slope at an angle from the lower edge of the front wall 21 to the rear edges of the wheel housings particularly as illustrated in Fig. 5, this additional slope providing increased capacity and also facilitating movement of gravel from the front to rear at the sides of the dump body when said dump body is tilted for maintaining distribution of the gravel across the width of the dump body adjacent the discharge slot 25.

A turntable 33 is arranged under the dump body preferably substantially in the center of the bottom thereof. The turntable illustrated consists of a cylindrical member 34 suitably secured to the bottom 20 of the dump body and projecting downwardly therefrom. The cylindrical member 34 is rotatably mounted in a recess 35 of a plate member 36, said recess forming a flange 37 on the plate member, the inner periphery of said flange engaging the outer periphery of the cylindrical member. The cylindrical member also has an axial pin 38 extending through a bore 39 in the plate member 36 with a nut or like fastening device on the lower end of the pin for holding the plate and cylindrical member in assembled condition.

The plate member has oppositely extending trunnions 40 which pivotally mount ends of forwardly extending links 41 and ends of rearwardly extending links 42. The rearwardly extending links are arranged on opposite sides of the turntable and have their rear ends pivotally mounted on upstanding ears 43 carried by the rear ends of the chassis frame side members 5 and 6. The forwardly extending links 41 are also arranged on each side of the turntable and have their forward ends pivotally mounted by pins 44 on one end of arms 45, the other ends of said arms being pivotally mounted by pins 46 on the chassis side members 5 and 6. A head 47 extends between the arms 45 and is pivotally connected thereto intermediate the pins 44 and 46, said head being connected by a yoke 48 to the end of a piston rod 49 which extends from one end of a cylinder 50, the other end of said cylinder being pivotally mounted as at 51 on the chassis transverse member 7. The piston rod and cylinder structure form an hydraulic jack with the opposite ends of the cylinder having fluid connections 52 and 53 leading to a portion of a control valve 54 which is operable to provide communication from a source of fluid pressure (not shown) to selected ends of the cylinder 50 to effect extension and retraction of the piston rod relative to said cylinder. Extension of the piston rod moves the head 47 rearwardly of the chassis, swinging the arms 45 about the pin 46 to move the links 41 rearwardly and due to the connection of the turntable with the chassis frame by the links 42 the turntable will be moved upwardly and rearwardly relative to the chassis to raise the dump body.

When in use for spreading gravel, the rear ends of the sills 27 are pivotally mounted by bolts 55 on ears 56 carried by the chassis frame members 5 and 6, the bolts 55 being coaxial with the pivotal mounting of the rear ends of the links 42 whereby when the sills 27 are mounted on the bolts 55 the dump body will be tilted upon extension of the hydraulic cylinder jack as indicated in Fig. 5. Since the bolts 55 are coaxial with the pivotal mounting of the rear ends of the links 42 the links merely swing with the dump body when the sills 27 of said dump body are pivotally mounted on the bolts 55; however, when the bolts 55 are removed, releasing the rear end of the dump body, the links 42 cooperate with the links 41 to support the trunnions of the turntable and the dump body may be pivoted up and down around the axis of the trunnions. The turntable cylindrical member has recesses 57 alignable with an aperture 58 in the flange of the plate member 36 whereby a pin 59 or other fastening device extending through the aperture 58 and into the recesses 57 prevents relative rotation of the turntable. Removal of the pin 59 permits the dump body to be rotated relative to the chassis to position other recesses in the cylindrical member in alignment with the aperture 58 for reinsertion of the pin 59 to lock the dump body in selected position.

A feed roller 60, preferably slightly longer than the slot 25 between the rear edge of the dump body bottom and bottom edge of the rear wall, extends transversely of the dump body. The feed roller preferably has a plurality of circular grooves 61 extending around the periphery thereof and is provided with reduced axial shafts 62 extending from the ends of the roller, said shafts being rotatably mounted in bearing members 63 on elongated blocks 64 which are slidably mounted in ways 65 extending longitudinally of the dump body, the blocks being connected as at 66 to hydraulic jack members 67, the other ends of which are connected to the dump body. The jacks 67 have cylinders 68, the opposite ends of which are connected by ducts 69 and 70 which extend alongside of the dump body to the front end thereof, the ducts each terminating in detachable couplings 71 for connection to hoses 72 leading to a portion of the control valve assembly 54, the couplings 71 preferably being of the quick detachable type for disconnection of the hydraulic ducts for rotation of the dump body. Operation of a lever on the control valve 54 selectively applies fluid pressure to the jacks 67 to move the feed roller toward and away from the lower edge of the rear wall 24 to adjust the spacing therebetween and regulate the discharge of gravel from the interior of the dump body. The feed roller is driven by a chain 73 which operatively connects a sprocket 74 on the feed roller shaft with a drive sprocket 75 on the shaft 76 of an hydraulic motor 77 which is connected by ducts 78 that extend to the forward end of the dump body and terminate in detachable couplings 79 for connecting hydraulic hoses 80 leading to a portion of the control valve 54. The hydraulic motor 77 is mounted on the block 64 so that it is not necessary to change the drive to adjust the position of the roller 60 in regulating the feed of gravel from the dump body.

The dump body preferably is of relatively large capacity. Gravel is usually carried to the job in dump trucks and the present structure contemplates the dumping of said gravel directly into the dump body of the gravel spreader, and when a load or desired portion thereof is dumped into the body 3 the gravel is then moved to the forward portion of the body to make room for additional gravel in the rear portion of the body. In order to move the gravel to the forward end of the body 3, said body is provided with a floor 81 overlying the rearward portion of the bottom 20 of the dump body, the floor being notched as at 82 whereby the forward portion of the floor can extend alongside of the wheel housings. Arms 83 fixed to the floor adjacent the forward edge thereof are pivotally mounted as at 84 on ears 85 fixed to the bottom 20 in spaced relation to the forward edge of the floor whereby when the floor 81 is hinged upwardly there will be a space between the forward edge 86 of the floor and the bottom 20. The floor preferably has an upwardly struck portion 87 extending upwardly and over the wheel housings to increase the gravel capacity of the floor. The rear edge of the floor extends to adjacent the rear wall 24 and a rear plate 88 overlying the rear wall 24 has its lower edge connected to the rear edge of the floor by a hinge 89, a flexible member 90 preferably overlying the hinge connection to prevent gravel passing through said hinge. Spaced abutment members 91 are secured to the plate 88 and extend toward the floor 81, terminating as at 92 in spaced relation to the floor as illustrated in Fig. 2, to provide limited hinging movement of the plate and floor.

The plate and floor assembly are operated by hydraulic jacks 93 consisting of cylinders 94 having ends 95 pivotally connected as at 96 to ears 97 extending upwardly from the front wall 21 of the dump body, piston rods 98 extending from the other ends of the cylinders and being pivotally connected to the rear plate 88 as at 99 in spaced relation to the hinge connection 89. The opposite ends of the cylinder 94 are connected by ducts 100 and 101 which terminate in detachable couplings 102 which connect with hose members 103 leading to a portion of the control valve 54 whereby operation of a control valve lever selectively applies fluid pressure to the jacks 93 to move the rear plate 88 and floor 81 forwardly or rearwardly about the pivotal connection 84 as desired.

An auxiliary seat 104, steering wheel 105 and pedal members 106 are arranged at the side of the chassis to provide the operator with a rearwardly facing elevated position for operating the spreader and facilitating vision of the operator.

In using a gravel spreader constructed as described, the bolts 55 are removed to release the connection between the sills 27 of the dump body and the chassis. The pin 59 is removed from the turntable whereby the dump body can be rotated and the detachable couplings 71, 79 and 102 are disconnected, then by operation of a lever on the control valve 54 fluid pressure is applied to the cylinder 50 to extend the piston rod 49 therefrom, swinging the arms 45 upwardly whereby the links 41 and 42 raise the turntable and the dump body thereon. The dump body is then rotated on the turntable 90° to position the body with the width thereof longitudinally of the chassis and the pin 59 inserted in the aperture 58 and aligned recess 57 to hold the dump body against further rotation, then stiff brace members 107 and 108 are arranged on the dump body and connected with the chassis frame forwardly and rearwardly of the rear wheels 11 to hold the dump body in position as shown in Figs. 9 and 10. The spreader is then ready for movement to a location where gravel is to be spread.

After arriving at the location the members 107 and 108 are disconnected, the pin 59 removed from the turntable and the body swung to a position wherein the feed roller 60 extends transversely of the chassis at the rear end thereof. The pin 59 is then reinserted in the turntable to retain same against further rotation. Bolts 55 are applied to pivotally connect the sills 27 to the ears 56 on the chassis and the couplings 71, 79 and 102 are connected. With the floor 81 and rear plate 88 resting on the bottom 20 and rear wall 24, the spreader is in condition for receiving gravel to be spread. It is preferable that fluid pressure be applied to the cylinder 50 to tilt the dump body and lower the upper end of the rear wall whereby the body of an ordinary dump truck will extend thereover. The dump truck is positioned relative to the spreader and a quantity of gravel, approximately one-half the capacity of the body, dumped into the body 3 on the floor 81 and rear wall 88. The lever of the control valve 54 is operated to apply fluid pressure to the hydraulic jacks 94 to retract the piston rods 98 into the cylinders pulling the rear wall 88 forwardly until the ends of the abutments 91 engage the floor 81 and then the continued operation of the jacks 94 swing the floor 81 and rear plate 88 thereon upwardly and forwardly on the pivotal connections 84 to throw the gravel on the floor 81 to the forward end of the dump body 3. Additional gravel is then dumped from said truck or a second truck into the rear portion of the body 3 behind the elevated floor 81, and then fluid pressure is applied to the cylinder 50 to lower the body 3 until the sills 27 rest on the chassis frame side members 5 and 6. The spreader is then ready to back along a bituminous covered roadway to spread gravel thereon.

The operator in the seat 104 facing to the rear of the spreader starts it moving and also operates a lever of the control valve 54 to apply liquid to the hydraulic motor 77 to drive the feed roller and by another lever of the control valve the operator applies fluid pressure to the hydraulic jacks 67 to adjust the position of the feed roller relative to the lower edge of the rear wall 24 to regulate the feed of gravel being distributed onto the road. As the gravel flows through the slot 25 and lowers the level in the rear portion of the body 3 the operator actuates a lever of the control valve 54 to apply fluid pressure to the cylinder 50 to tilt the body 3 whereby gravel at the forward end of the body will move rearwardly between the forward edge of the floor 81 and the bottom 20, the passing of the gravel therethrough aiding in spreading or distributing the gravel throughout the width of the body and aiding in equal distribution of the gravel on the roadway.

As the gravel spreader is backed along the bituminous covered road the feed roller leads the wheels of the spreader so that the wheels of said spreader operate on the gravel covered surface. After the load of gravel in the body 3 is emptied the floor 81 and rear wall 88 are again lowered into engagement with the bottom 20 and rear wall 24 and the spreader moved forwardly whereby dump trucks can operate over the covered surface to again dump gravel into the body member 3, the cycle of operation being repeated until the desired surface is all graveled, then the bolts 55 are removed, the body 3 elevated, the pin 59 removed and the hydraulic couplings disconnected whereby the dump body can be rotated relative to the chassis to present a width of the structure that is within the governmental highway width limit regulations.

It is believed obvious that I have provided a self-propelled spreading unit of large capacity and sturdy construction for distributing gravel and the like on road surfaces and which can be arranged for transportation along a highway from one location to another.

What I claim and desire to secure by Letters Patent is:

1. In a spreader for distributing material such as gravel and the like on roadways having a self-propelled chassis with front and rear wheels, a rearwardly tilting body on the chassis and having front, side, rear and bottom walls defining a receptacle for receiving material to be spread and a rotary feed member on the body adjacent the rear thereof cooperating with an elongated opening in the body to define a material discharge opening, a floor in the rear portion of the body overlying the bottom wall, arms on the floor and extending forwardly thereof, means pivotally connecting the arms to the body in spaced relation to the floor, and means on the body connected to the floor for swinging said floor upwardly and forwardly to move any material thereon to the forward portion of the body.

2. A spreader for distributing material such as gravel and the like on roadways comprising, a self-propelled chassis having front and rear wheels, a body for receiving material to be spread, said body having front, side, rear and bottom walls and an elongated opening transversely of the body at the rear thereof, a rotary feed member on the body adjacent the elongated opening and cooperating therewith to define the material discharge opening, means pivotally connecting the rear portion of the body to the chassis, means on the chassis connected with the body for tilting said body rearwardly, a floor in the rear portion of the body overlying the bottom wall and terminating adjacent to and above the material discharge opening, arms on the floor and extending forwardly thereof, means pivotally connecting the arms to the body in spaced relation to the floor, a rear plate hingedly connected to the rear of the floor, and means on the body connected to the rear plate for swinging said rear plate and floor upwardly and forwardly to move any material thereon to the forward portion of the body and uncover the material discharge opening.

3. In a spreader for distributing material such as gravel and the like on roadways having a self-propelled chassis with front and rear wheels, a rearwardly tilting body on the chassis and having front, side, rear and bottom walls defining a receptacle for receiving material to be spread and a rotary feed member on the body adjacent the rear thereof cooperating with an elongated opening in the body to define a material discharge opening, a floor member in the rear portion of the body overlying the bottom wall with the rear edge of said floor member adjacent to and above the material discharge opening, means pivotally connecting the forward portion of the floor to the body, a rear plate member hingedly connected adjacent to the rear of the floor member, means on the body and connected to the rear plate member for swinging said rear plate member forwardly relative to the floor, and stop means on one of the floor and rear plate members and engageable with the other to limit forward swinging of the rear plate member relative to the floor member whereby further forward movement of the rear plate member swings the rear plate member and floor member forwardly and upwardly relative to the bottom wall of the body to move any material on the floor to a forward position in the body.

4. In a spreader for distributing material such as gravel and the like on roadways having a self-propelled chassis with front and rear wheels, a rearwardly tilting body on the chassis and having front, side, rear and bottom walls defining a receptacle for receiving material to be spread and a rotary feed member on the body adjacent the rear thereof cooperating with an elongated opening in the body to define a material discharge opening, a floor in the rear portion of the body overlying the bottom wall with the rear edge of said floor adjacent to and above the material discharge opening, means on the forward portion of the floor and pivotally connected to the body in spaced relation to the forward edge of said floor, a rear plate hingedly connected to the rear of the floor, means on the body and connected to the rear plate for swinging said rear plate forwardly relative to the floor, and stop means on the rear plate engageable with the floor to limit forward swinging of the plate relative to the floor whereby further forward movement of the rear plate swings the rear plate and floor forwardly and upwardly relative to the bottom wall of the body to move any material on the floor to a forward position in the body and uncover the material discharge opening.

5. In a spreader for distributing material such as gravel and the like on roadways having a self-propelled chassis with front and rear wheels, a rearwardly tilting body on the chassis and having front, side, rear and bottom walls defining a receptacle for receiving material to be spread and a rotary feed member on the body adjacent the rear thereof cooperating with an elongated opening in the body to define a material discharge opening, a floor in the rear portion of the body overlying the bottom wall with the rear edge of said floor adjacent to and above the material discharge opening, arms fixed to the floor and extending forwardly thereof, means pivotally connecting the arms to the body in forwardly spaced relation to the floor, a rear plate connected adjacent to the rear of the floor and overlying the rear wall of the body, and means pivotally mounted on the body and connected to the rear plate for swinging said rear plate and floor upwardly and forwardly to move any material thereon to the forward portion of the body and uncover the material discharge opening, said upwardly and forwardly swinging movement of the floor effecting a spacing of the forward end of the floor from the body whereby rearward tilting of the body will cause material in the forward portion thereof to flow under the forward edge of the floor to the rear portion of the body and discharge through the material discharge opening.

6. In a spreader for distributing material such as gravel and the like on roadways having a self-propelled chassis with front and rear wheels, a rearwardly tilting body on the chassis and having front, side, rear and bottom walls defining a receptacle for receiving material to be spread and a rotary feed member on the body adjacent the rear thereof cooperating with an elongated opening in the body to define a material discharge opening, a floor in the rear portion of the body overlying the bottom wall with the rear edge of said floor adjacent to and above the material discharge opening, arms fixed to the floor and extending forwardly thereof, means pivotally connecting the arms to the body in forwardly spaced relation to the floor, a rear plate hingedly connected adjacent to the rear of the floor and overlying the rear wall of the body, stop means on one of the floor and rear plate members and engageable with the other thereof after a predetermined forward swinging movement of the rear plate relative to the floor, and hydraulic means pivotally mounted on the body and connected to the rear plate for swinging said rear plate and floor upwardly and forwardly to move any material thereon to the forward portion of the body and uncover the material discharge opening, said upwardly and forwardly swinging movement of the floor effecting a spacing of the forward end of the floor from the body whereby rearward tilting of the body will cause material in the forward portion thereof to flow under the forward edge of the floor to the rear portion of the body and discharge through the material discharge opening.

References Cited in the file of this patent

UNITED STATES PATENTS

| Number | Name | Date |
|---|---|---|
| 18,360 | Squier | Oct. 6, 1857 |
| 1,061,743 | Heile et al. | May 13, 1913 |
| 1,723,805 | Nickerson | Aug. 6, 1929 |
| 2,084,656 | Rottee | June 22, 1937 |
| 2,327,679 | Swenson | Aug. 24, 1943 |
| 2,360,901 | Simmons | Oct. 24, 1944 |
| 2,393,732 | Balbi | Jan. 29, 1946 |
| 2,532,050 | Acton | Nov. 28, 1950 |

FOREIGN PATENTS

| Number | Country | Date |
|---|---|---|
| 679,557 | France | Jan. 10, 1930 |